(12) United States Patent
Jönsson

(10) Patent No.: US 9,569,877 B2
(45) Date of Patent: Feb. 14, 2017

(54) METHOD AND DEVICE FOR ADAPTING A GRAPHICAL EFFECT

(71) Applicant: Sony Corporation, Tokyo (JP)

(72) Inventor: Mårten Jönsson, Malmö (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 22 days.

(21) Appl. No.: 14/597,637

(22) Filed: Jan. 15, 2015

(65) Prior Publication Data

US 2015/0206336 A1 Jul. 23, 2015

(30) Foreign Application Priority Data

Jan. 17, 2014 (EP) .................................... 14151618

(51) Int. Cl.
| | | |
|---|---|---|
| *G06T 13/00* | (2011.01) | |
| *G06T 13/80* | (2011.01) | |
| *G06F 17/30* | (2006.01) | |
| *G09G 5/36* | (2006.01) | |
| *G06F 3/048* | (2013.01) | |

(52) U.S. Cl.
CPC ............... *G06T 13/80* (2013.01); *G06F 3/048* (2013.01); *G06F 17/30312* (2013.01); *G09G 5/363* (2013.01); *G06T 2200/24* (2013.01); *G06T 2200/28* (2013.01); *G06T 2213/12* (2013.01); *G09G 2354/00* (2013.01); *G09G 2370/22* (2013.01)

(58) Field of Classification Search
CPC .................. A63F 2300/5506; G06Q 30/0247; G06Q 30/0254
USPC ............................ 345/473; 705/14.43, 14.68
See application file for complete search history.

(56) References Cited

U.S. PATENT DOCUMENTS

| | | | | |
|---|---|---|---|---|
| 2002/0147645 A1* | 10/2002 | Alao | ................... | G06Q 30/0209 705/14.54 |
| 2008/0263673 A1* | 10/2008 | Brun | ....................... | A63F 13/12 726/26 |
| 2011/0029988 A1* | 2/2011 | Mittal | ....................... | G06F 9/54 719/314 |

OTHER PUBLICATIONS

Communication with European Search Report and European Search Opinion, European Application No. 14151618.7, May 27, 2014.
Anonymous, "window management—Has the minimize speed been increased in 12.10?—Ask Ubuntu", Nov. 3, 2012, XP055116560, retrieved from the Internet: URL:http://askubuntu.com/questions/207022/has-the-minimize-speed-been-increased-in-12-10 [retrieved on May 6, 2014].

\* cited by examiner

*Primary Examiner* — Thomas Lett
(74) *Attorney, Agent, or Firm* — Myers Bigel, P.A.

(57) ABSTRACT

A method in an electronic device for adapting a graphical effect used in a Graphical User Interface, GUI, comprised in the electronic device for interacting with a user of the electronic device is provided. The electronic device is associated with at least one database. At least one software application using the graphical effect is running on the electronic device. The electronic device is adapted to detect a number of times the at least one application is started, save the detected number of times in the at least one database, and change a time for the graphical effect to be shown based on the detected number of times the at least one application is started, whereby performance of the graphical effect is improved.

17 Claims, 2 Drawing Sheets

METHOD AND DEVICE FOR ADAPTING A GRAPHICAL EFFECT

CROSS REFERENCE TO RELATED APPLICATION

This application claims priority to European Patent Application No. 14151618.7, filed Jan. 17, 2014, the disclosure and content of which is incorporated herein by reference in its entirety as if set forth fully herein.

TECHNICAL FIELD

Embodiments herein relate to an electronic device and a method. In particular it relates to adapting a graphical effect used in a Graphical User Interface (GUI), comprised in the electronic device for interacting with a user of the electronic device.

BACKGROUND

In Graphical User Interfaces (GUI) present in modern electronic devices, transitions and/or animations are often used as a graphical effect to e.g. visualize a structure or a conceptual model of an application so that a user of an electronic device may understand the structure of the application, and thus may navigate more efficiently through the information architecture of an application. An example of this is applications that use the Drawer User Interface (UI) component, reveal this component on launch of the application and display a transition throughout during launch of the application. Transitions and/or animations may also be used to provide an enchanting feeling of advanced and polished technological implementation. An example of this is the 2.5 dimensional list animation used in Windows Modern/Metro UI.

In present GUIs a general target of 250 msec is often used as a standard time for animations or transitions as this is a value allowing the user to understand and appreciate the graphical effect without growing overly tired of the effect once it is learned.

A problem is that once the user has understood the structure of an application and been enchanted, there is a risk that repetition of the transition, or animation, provides little value to the user. On the contrary, constant repetition of the transition or animation may instead annoy the user by slowing down the UI. The animation or transition that served an emotional and/or pedagogical function in the beginning loses that function once the UI is understood and the user simply want to proceed with their task in the most efficient manner.

Attempts to solve this problem are for example the types of nudges that SoMC sometimes use in e.g. the Homescreen application where the button that launches the Application Tray does a scale up/down animation when a user starts using the application. After the user successfully has pressed the button on seven occasions it will no longer do the scaling animation.

Another way of solving the above mentioned problem is to provide a possibility for the user to change the time for a graphical effect to be shown. However, spending time on such changes may be annoying to the user.

SUMMARY

An object of embodiments herein is to improve performance of a graphical effect.

According to a first aspect of embodiments herein, the object is achieved by a method in an electronic device. A graphical effects is used in a Graphical User Interface, GUI. The GUI is comprised in the electronic device for interacting with a user of the electronic device. The electronic device is associated with at least one database. At least one software application using the graphical effect is adapted to run on the electronic device. The electronic device is adapted to detect a number of times the at least one application is started, save the detected number of times in the at least one database, and change a time for the graphical effect to be shown based on the detected number of times the at least one application is started, whereby performance of the graphical effect is improved.

According to a second aspect of embodiments herein, the object is achieved by an electronic device adapted for improving performance of a graphical effect used in a GUI. The electronic device comprises the Graphical User Interface, GUI, for interacting with a user of the electronic device, and is associated with at least one database. The electronic device is adapted to run at least one software application. The electronic device comprises a detector adapted to detect a number of times the at least one application is started, a computer unit adapted to save the detected number of times in the at least one database, and adapted to change a time for the graphical effect to be shown in the GUI based on the detected number of times the at least one application is started.

BRIEF DESCRIPTION OF THE DRAWINGS

Examples of embodiments herein are described in more detail with reference to attached drawings in which.

DETAILED DESCRIPTION

Embodiments herein will be exemplified in the following detailed non-limiting description.

Figure 1:
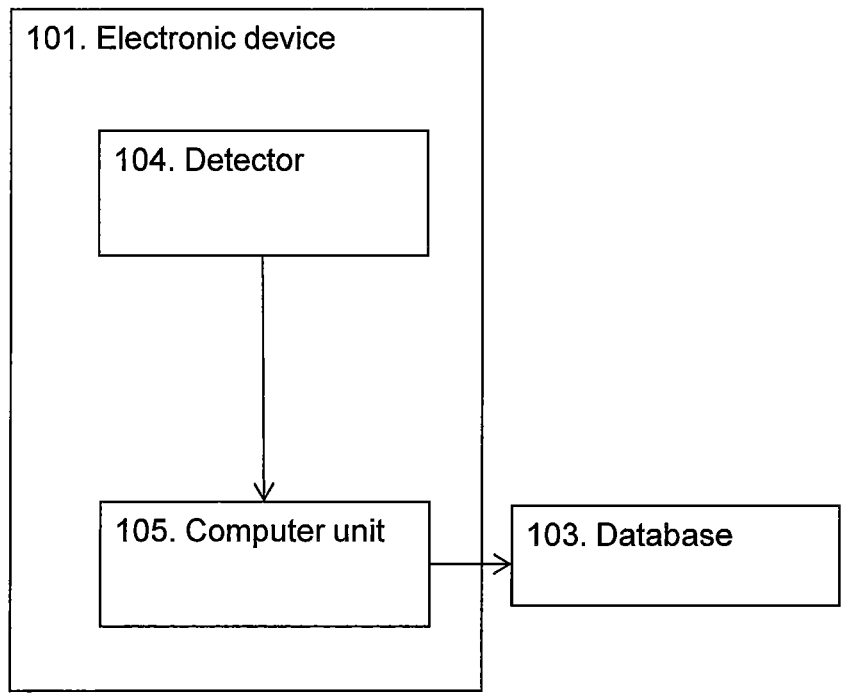
FIG. 1 show an electronic device in accordance with embodiments herein.

An electronic device 101 will now be described with reference to FIG. 1. Examples of such an electronic device may e.g. be a computer. The electronic device 101 may further be a mobile electronic device that may be a mobile telephone, a smartphone, handheld computer, a laptop or a surf tablet.

The electronic device 101 is adapted for improving performance of a graphical effect, and comprises a GUI for interacting with a user of the electronic device 101. The electronic device 101 is associated with at least one database 102. The at least one database 102 may be comprised in a cloud associated with the electronic device 101. As an example, the cloud may be a computer network comprising one or more computers. At least one software application using a graphical effect is running on the electronic device 101. As an alternative, the at least one database 102 may be comprised in the at least one software application.

The graphical effect may for example be an animation. One single application may run on the electronic device, or two or more applications may run in parallel on the electronic device 101. In that case, the graphical effect may be a transition rendered when the user moves between the two or more applications.

The electronic device 101 further comprises a detector 103 for detecting a number of times the at least one application is started, a computer unit 104 adapted to save the detected number of times in the at least one database 102. The computer unit 104 is adapted for changing a time for the graphical effect to be shown in the GUI based on the detected number of times the at least one application is started.

Figure 2:
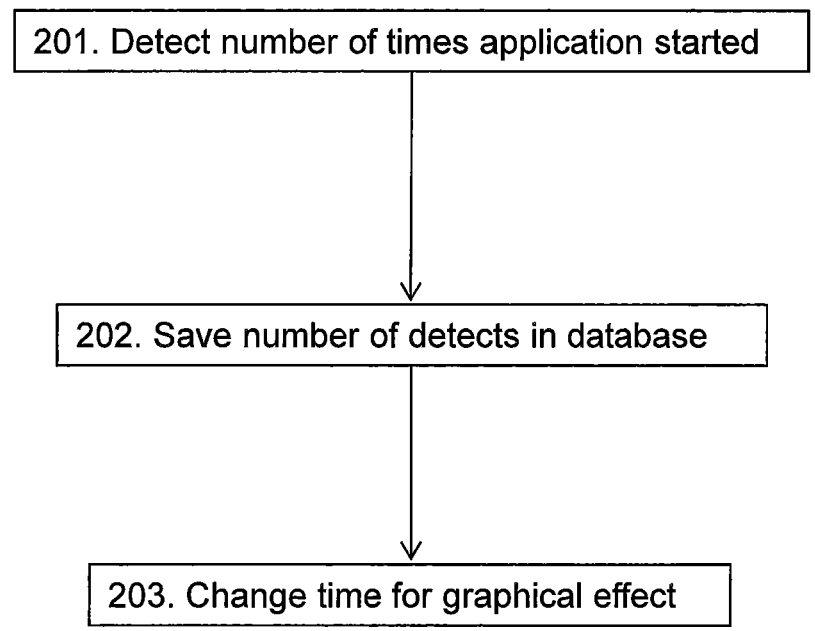
FIG. 2 is a flow chart for methods described herein.

Example of embodiments of a method in the electronic device will now be described with reference to a flowchart depicted in FIG. 2. The method comprises the following actions, which actions may be taken in any suitable order.

Action 201

The electronic device 101 detects a number of times the at least one application is started.

Action 202

The electronic device 101 saves the detected number of times the at least one application is started in the at least one database. By implementing a local, or cloud based, database tracking the usage of an application is provided.

Action 203

The electronic device 101 changes a time for the graphical effect to be shown based on the detected number of times the at least one application is started, whereby performance of the graphical effect is improved. The electronic device 101 saves the number of starts of an application in a database. Based on the number of starts a time value, e.g in msec, may be provided. The time value may be used to set a total time of the animation effect by an animation script. Changing may comprise decreasing the time for the graphical effect to be shown when the detected number of times the at least one application is started increases. Thus, the number of times an application is started may be used to gradually speed up graphical effects like transitions or animations as they lose in value as pedagogical and/or enchanting functions. Thus, it is ensured that graphical effects like animations and/or transitions explaining the UI during the initial use of the application will gradually be sped up when the user is more in comfort with and has understood the UI of the application. Use of a database to track the number of times an application is started and gradually speed up transitions and/or animations as the user grows more accustomed to the application UI thereby allows the user to experience and feel that the UI is quick and responsive even after the user has used it for a number of times.

An advantage of speeding up the graphical effects like transitions/animations rather than removing them is that the user will still experience a fluidity of the UI as well as being reminded about the conceptual model without being forced to wait for longer animations/transitions which may be annoying.

A graphical effect like a transition and/or animation that may last for e.g. 750 msec at a first launch may gradually be sped up to 150 msec over the first 15 application launches and then stay at that value for the remainder of the applications' life time.

When using the word "comprise" or "comprising" it shall be interpreted as non-limiting, in the meaning of consist at least of.

When using the word action/actions it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used. Therefore, this disclosure should not be limited to the specific form set forth herein. This disclosure is limited only by the appended claims and other embodiments than the mentioned above are equally possible within the scope of the claims.

The invention claimed is:

1. A method in an electronic device for adapting a graphical effect used in a Graphical User Interface, GUI, comprised in the electronic device for interacting with a user of the electronic device, the electronic device is associated with at least one database, at least one software application using the graphical effect is running on the electronic device, the method comprising:

detecting a number of times the at least one application is started;

saving the detected number of times in the at least one database; and displaying the graphical effect for a time duration that is decreased from a first time value to a second time value responsive to an increase in the detected number of times at least one application is started, wherein the first time value is longer than the second time value, wherein the second time value is a non-zero time value, and whereby performance of the graphical effect is improved.

2. The method of claim 1, wherein the graphical effect is an animation.

3. The method of claim 1, wherein two or more applications are running in parallel on the electronic device, and wherein displaying the graphical effect comprises decreasing a time of a transition rendered when the user moves between the two or more applications.

4. The method of claim 1 wherein the electronic device is a mobile electronic device.

5. The method of claim 1, wherein the at least one database is comprised in a cloud associated with the electronic device.

6. The method of claim 1, wherein the at least one database is comprised in the at least one software application.

7. The method of claim 1, wherein displaying the graphical effect comprises continuously displaying the graphical effect for the time duration that is decreased to the second time value.

8. The method of claim 1, wherein displaying the graphical effect comprises displaying the graphical effect for the time duration that is decreased to the second time value by increasing a speed of a display of the graphical effect.

9. The method of claim 1, wherein displaying the graphical effect comprises gradually decreasing the time duration for displaying the graphical effect from the first time value to the second time value over a predetermined number of times the at least one application is started and displaying the graphical effect for the time duration while constraining the time duration to not be less than the second time value.

10. An electronic device adapted for adapting a graphical effect, and comprising a Graphical User Interface, GUI, for interacting with a user of the electronic device, and being associated with at least one database, wherein at least one software application using a graphical effect is running on the electronic device, the electronic device comprising:

a detector for detecting a number of times the at least one application is started; and a computer adapted for saving the detected number of times in the at least one database, and adapted for displaying the graphical effect in the GUI for a time duration that is decreased from a first time value to a second time value responsive to an increase in the detected number of times the at least one application is started, wherein the first time value is longer than the second time value and wherein the second time value is a non-zero time value.

11. The electronic device of claim 10, wherein the graphical effect is an animation having a time duration that is controlled by the computer based on the detected number of times the at least one application is started.

12. The electronic device of claim 10, wherein the electronic device is adapted to run two or more applications in parallel, and wherein the graphical effect is a transition, rendered when the user moves between the two or more applications, that is controlled by the computer based on the detected number of times the at least one application is started.

13. The electronic device of claim 12, wherein the computer is adapted for continuously displaying the graphical effect for the time duration that is decreased to the second time value.

14. The electronic device of claim 12, wherein the computer is adapted for displaying the graphical effect for the time duration that is decreased to the second time value by increasing a speed of a display of the graphical effect.

15. The electronic device of claim 12, wherein the computer is adapted for gradually decreasing the time duration for displaying the graphical effect from the first time value to the second time value over a predetermined number of times the at least one application is started and adapted for displaying the graphical effect for the time duration while constraining the time duration to not be less than the second time value.

16. The electronic device of claim 10 wherein the electronic device is a mobile electronic device.

17. The electronic device claim 10, wherein the at least one database is comprised in the at least one software application.

* * * * *

UNITED STATES PATENT AND TRADEMARK OFFICE
CERTIFICATE OF CORRECTION

PATENT NO. : 9,569,877 B2  
APPLICATION NO. : 14/597637  
DATED : February 14, 2017  
INVENTOR(S) : Jönsson Page 1 of 1

It is certified that error appears in the above-identified patent and that said Letters Patent is hereby corrected as shown below:

On the Title Page

(30) Foreign Application Priority Data:  
Please correct "(EP)..........14151618"  
To read -- (EP)..........14151618.7 --

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*